(12) United States Patent
Hall et al.

(10) Patent No.: US 7,934,570 B2
(45) Date of Patent: May 3, 2011

(54) DATA AND/OR POWERSWIVEL

(75) Inventors: David R. Hall, Provo, UT (US); Scott Dahlgren, Alpine, UT (US); Jonathan Marshall, Provo, UT (US)

(73) Assignee: Schlumberger Technology Corporation, Houston, TX (US)

( * ) Notice: Subject to any disclaimer, the term of this patent is extended or adjusted under 35 U.S.C. 154(b) by 398 days.

(21) Appl. No.: 11/761,730

(22) Filed: Jun. 12, 2007

(65) Prior Publication Data
US 2008/0309514 A1 Dec. 18, 2008

(51) Int. Cl.
*H01R 39/30* (2006.01)
*E21B 17/05* (2006.01)

(52) U.S. Cl. .......................................... 175/320; 439/5

(58) Field of Classification Search .................. 175/320; 166/65.1; 439/5, 178, 179
See application file for complete search history.

(56) References Cited

U.S. PATENT DOCUMENTS

| | | | |
|---|---|---|---|
| 1,433,331 A * | 10/1922 | Angstrom | 439/5 |
| 1,669,653 A * | 5/1928 | Campbell | 439/5 |
| 2,414,719 A | 1/1947 | Cloud | |
| 2,584,026 A | 1/1952 | Kendrick | |
| 2,584,028 A | 1/1952 | Kendrick | |
| 2,730,602 A | 1/1956 | Porterfield | |
| 2,702,890 A | 2/1956 | Hildebrandt | |
| 2,915,731 A * | 12/1959 | Bradley et al. | 439/5 |
| 3,021,496 A | 2/1962 | Konyon | |
| 3,022,479 A | 2/1962 | Rohrbach | |
| 3,191,082 A * | 6/1965 | Csillag | 310/219 |
| 3,295,091 A * | 12/1966 | Von Mossin | 439/5 |
| 3,518,608 A | 6/1970 | Papadopoulos | |
| 3,753,206 A | 8/1973 | Busuttil | |
| 3,957,330 A | 5/1976 | Roscoe | |
| 4,484,789 A * | 11/1984 | Leitner et al. | 439/5 |
| 4,739,325 A | 4/1988 | MacLeod | |
| 4,788,544 A | 11/1988 | Howard | |
| 5,468,153 A | 11/1995 | Brown | |
| 5,480,528 A | 1/1996 | Bischoping | |
| 5,823,257 A | 10/1998 | Peyton | |
| 6,012,015 A | 1/2000 | Tubel | |
| 6,018,301 A | 1/2000 | Smith | |
| 6,075,461 A | 6/2000 | Smith | |

(Continued)

OTHER PUBLICATIONS

Definition of "lead", Merriam-Webster Dictionary, accessed Nov. 12, 2009.*

(Continued)

*Primary Examiner* — Kenneth Thompson
*Assistant Examiner* — Blake Michener
(74) *Attorney, Agent, or Firm* — Holme Roberts & Owen LLP (57) ABSTRACT

In one aspect of the invention, a swivel for use in a drilling operation comprises a body with a central bore adapted for threaded connection to a tool string component. At least one electrically conductive medium is rotationally supported within the bore and adapted to rotate with respect to an electrically conductive receiver that is rotationally fixed to and disposed within the body. The electrically conductive medium and the receiver are in electrical communication through an electrically conductive arm that is rotationally fixed to the electrically conductive medium and at least partially disposed within an electrically conductive fluid disposed within a reservoir. The reservoir comprises a rigid shape that is partially filled by the conductive fluid. At least one rotary seal is disposed intermediate the reservoir and the electrically conductive medium. The rigid shape of the reservoir is adapted to prevent the conductive fluid from accumulating around the rotary seal.

20 Claims, 8 Drawing Sheets

U.S. PATENT DOCUMENTS

| | | | |
|---|---|---|---|
| 6,113,406 A * | 9/2000 | Lin et al. | 439/179 |
| 6,144,316 A | 11/2000 | Skinner | |
| 6,177,882 B1 | 1/2001 | Ringgenberg | |
| 6,252,518 B1 | 6/2001 | Laborde | |
| 6,392,317 B1 | 5/2002 | Hall | |
| 6,402,524 B2 * | 6/2002 | Wurm et al. | 439/10 |
| 6,540,032 B1 * | 4/2003 | Krueger | 175/40 |
| 6,663,395 B2 * | 12/2003 | Sobhani | 439/21 |
| 6,670,880 B1 | 12/2003 | Hall | |
| 6,688,396 B2 | 2/2004 | Floerke | |
| 6,717,501 B2 | 4/2004 | Hall | |
| 6,739,413 B2 * | 5/2004 | Sharp et al. | 175/61 |
| 6,799,632 B2 | 10/2004 | Hall | |
| 6,821,147 B1 | 11/2004 | Hall | |
| 6,830,467 B2 | 12/2004 | Hall | |
| 6,844,498 B2 | 1/2005 | Hall | |
| 6,866,306 B2 | 3/2005 | Boyle | |
| 6,888,473 B1 | 5/2005 | Hall | |
| 6,913,093 B2 | 7/2005 | Hall | |
| 6,929,493 B2 | 8/2005 | Hall | |
| 6,945,802 B2 | 9/2005 | Hall | |
| 6,968,611 B2 | 11/2005 | Hall | |
| 7,168,510 B2 * | 1/2007 | Boyle et al. | 175/107 |
| 7,193,527 B2 * | 3/2007 | Hall et al. | 340/854.3 |
| 2004/0039466 A1 | 2/2004 | Lilly | |
| 2004/0104797 A1 | 6/2004 | Hall | |
| 2004/0113808 A1 | 6/2004 | Hall | |
| 2004/0145492 A1 | 7/2004 | Hall | |
| 2004/0150532 A1 | 8/2004 | Hall | |
| 2004/0164833 A1 | 8/2004 | Hall | |
| 2004/0164838 A1 | 8/2004 | Hall | |
| 2004/0216847 A1 | 11/2004 | Hall | |
| 2004/0244916 A1 | 12/2004 | Hall | |
| 2004/0244964 A1 | 12/2004 | Hall | |
| 2004/0246142 A1 | 12/2004 | Hall | |
| 2005/0001735 A1 | 1/2005 | Hall | |
| 2005/0001738 A1 | 1/2005 | Hall | |
| 2005/0035874 A1 | 2/2005 | Hall | |
| 2005/0035875 A1 | 2/2005 | Hall | |
| 2005/0035876 A1 | 2/2005 | Hall | |
| 2005/0036507 A1 | 2/2005 | Hall | |
| 2005/0039912 A1 | 2/2005 | Hall | |
| 2005/0045339 A1 | 3/2005 | Hall | |
| 2005/0046588 A1 | 3/2005 | Wisler | |
| 2005/0046590 A1 | 3/2005 | Hall | |
| 2005/0067159 A1 | 3/2005 | Hall | |
| 2005/0070144 A1 | 3/2005 | Hall | |
| 2005/0082092 A1 | 4/2005 | Hall | |
| 2005/0092499 A1 | 5/2005 | Hall | |
| 2005/0093296 A1 | 5/2005 | Hall | |
| 2005/0095827 A1 | 5/2005 | Hall | |
| 2005/0115717 A1 | 6/2005 | Hall | |
| 2005/0145406 A1 | 7/2005 | Hall | |
| 2005/0150653 A1 | 7/2005 | Hall | |
| 2005/0161215 A1 | 7/2005 | Hall | |
| 2005/0173128 A1 | 8/2005 | Hall | |
| 2005/0212530 A1 | 9/2005 | Hall | |
| 2005/0236160 A1 | 10/2005 | Hall | |
| 2005/0279508 A1 | 12/2005 | Hall | |
| 2005/0284659 A1 | 12/2005 | Hall | |
| 2005/0284662 A1 | 12/2005 | Hall | |
| 2005/0284663 A1 | 12/2005 | Hall | |
| 2005/0285645 A1 | 12/2005 | Hall | |
| 2005/0285705 A1 | 12/2005 | Hall | |
| 2005/0285706 A1 | 12/2005 | Hall | |
| 2005/0285751 A1 | 12/2005 | Hall | |
| 2005/0285752 A1 | 12/2005 | Hall | |
| 2005/0285754 A1 | 12/2005 | Hall | |
| 2008/0166917 A1 * | 7/2008 | Hall et al. | 439/583 |

OTHER PUBLICATIONS

PCT/US03/16475, Published Dec. 4, 2005, Applicant Baker Hughes, International Search Report "Documents Considered to be Relevant."

* cited by examiner

DATA AND/OR POWERSWIVEL

BACKGROUND OF THE INVENTION

The present invention relates to the field of data and/or power transmission. More specifically, it relates to apparatus for transmitting data and/or power from downhole tool strings to stationary equipment, such as surface equipment.

Downhole tool strings, such as drill strings, have become increasingly versatile in the last half century. In addition to traditional oil, gas, and geothermic exploration and production purposes, tubular tool strings are often used for what is known as horizontal directional drilling to install underground power lines, communication lines, water lines, sewer lines, utility lines, and gas lines. This sort of downhole drilling is particularly useful for boring underneath roadways, waterways, populated areas, and environmentally protected areas.

The increased versatility of downhole drilling with tool strings has led to a higher demand for apparatus that are able to transmit a power signal to downhole equipment as well as transmit data and/or power between downhole tools and surface equipment. Hence, several different approaches to solving the problem of transmitting an electrical signal across the joints of a tool string have been developed and are known in the art.

U.S. Pat. Nos. 6,670,880 and 6,717,501 to Hall et al., both of which are incorporated herein by reference for all that they disclose, teach of a system wherein tubular components are coupled at threaded joints and comprises a signal transmission system in the tool string. Other downhole telemetry systems are disclosed in U.S. Pat. No. 6,688,396 to Floerke et al and U.S. Pat. No. 6,641,434 to Boyle et al, which are also herein incorporated by reference for all that they contain.

Optimally, a system for transmitting power or data between surface equipment and downhole tools in a tool string should be transparent to the tool string operator or crew, as time delays introduced by a complicated telemetry system may represent a significant amount of money.

The use of data swivels for transmitting real-time data to stationary equipment has been disclosed in the art. Some examples of Mercury-type rotating electrical contacts that may be used in data swivels are found in U.S. Pat. No. 2,702,890 to Hildebrandt; U.S. Pat. No. 3,021,496 to Kenyon; U.S. Pat. No. 3,022,479 to Rohrbach; and U.S. Pat. No. 3,957,330 to Roscoe et al. Examples of inductive swivels for use in downhole applications are disclosed in U.S. Pat. Nos. 7,098,802 and 7,193,527 both to Hall et al. Each of the above listed patents is herein incorporated by reference.

BRIEF SUMMARY OF THE INVENTION

A swivel for use in a downhole drilling operation comprises a body with a central bore adapted for threaded connection to a tool string component. At least one electrically conductive medium is rotationally supported within the bore and adapted to rotate with respect to an electrically conductive receiver that is rotationally fixed to and disposed within the body. The electrically conductive medium and the receiver are in electrical communication through an electrically conductive arm that is rotationally fixed to the electrically conductive medium and at least partially disposed within an electrically conductive fluid disposed within a reservoir. The reservoir comprises a rigid shape that is partially filled by the electrically conductive fluid. At least one rotary seal is disposed intermediate the reservoir and the electrically conductive medium. The rigid shape of the reservoir is adapted to prevent the conductive fluid from accumulating around the rotary seal.

The swivel may comprise a plurality of reservoirs, electrically conductive arms, or electrically conductive media. The reservoir may be disposed circumferentially around at least a portion of the electrically conductive medium. The electrically conductive medium may comprise and electrically conductive core that may be surrounded by a dielectric material selected from the group consisting of alumina, ferrite, polycrystalline diamond, carbon, polymers, plastics, rubber, latex, and/or oxides of Mg, Al, Si, Yb, Ca, Be, Sr, Ns, Sm, Er, Eu, Sc, La, Gd, Dy, Tm, ceramics and combinations thereof. The electrically conductive medium may comprise a coaxial cable, a pair of twisted wires, a biaxial cable, a triaxial cable, insulated copper wires, or combinations thereof. An electrically conductive shield of a coaxial cable may be in electrical communication with a first reservoir and an electrically conductive core of the coaxial cable may be in communication with a second reservoir. A channel may extend from a first reservoir to second reservoir or to a second end of the first reservoir.

The receiver may be an electrically conductive portion of the body or may be in electrical communication with an electrical device. The electrical device may be a computer, a data processing unit, a data storage unit, or combinations thereof. The swivel may be in electronic communication with a downhole telemetry system. The electrically conductive fluid may comprise mercury, indium, an aqueous solution, liquid metal, gallium, eutectic mixtures, mixtures thereof, compositions thereof, or a combination thereof.

The rigid shape of the reservoir may be adapted to retain the conductive fluid within the reservoir between the receiver and the electrically conductive arm and away from the at least one rotary seal when a central axis of the reservoir is parallel to the ground and when it is not parallel to the ground. The rigid shape may comprise a generally cylindrical geometry that is coaxial with the body and comprises inner and outer diameters. The rotary seal may comprise at least one o-ring, gasket, adhesive, washer, fastener, back-up or combinations thereof. The reservoir may comprise a flow restrictor proximate the rotary seal. A volume of the reservoir may be less than 50% filled by the electrically conductive fluid. In some embodiments of the invention the reservoir may comprise an internal separator wall.

DETAILED DESCRIPTION OF THE INVENTION AND THE PREFERRED EMBODIMENT

Figure 1:
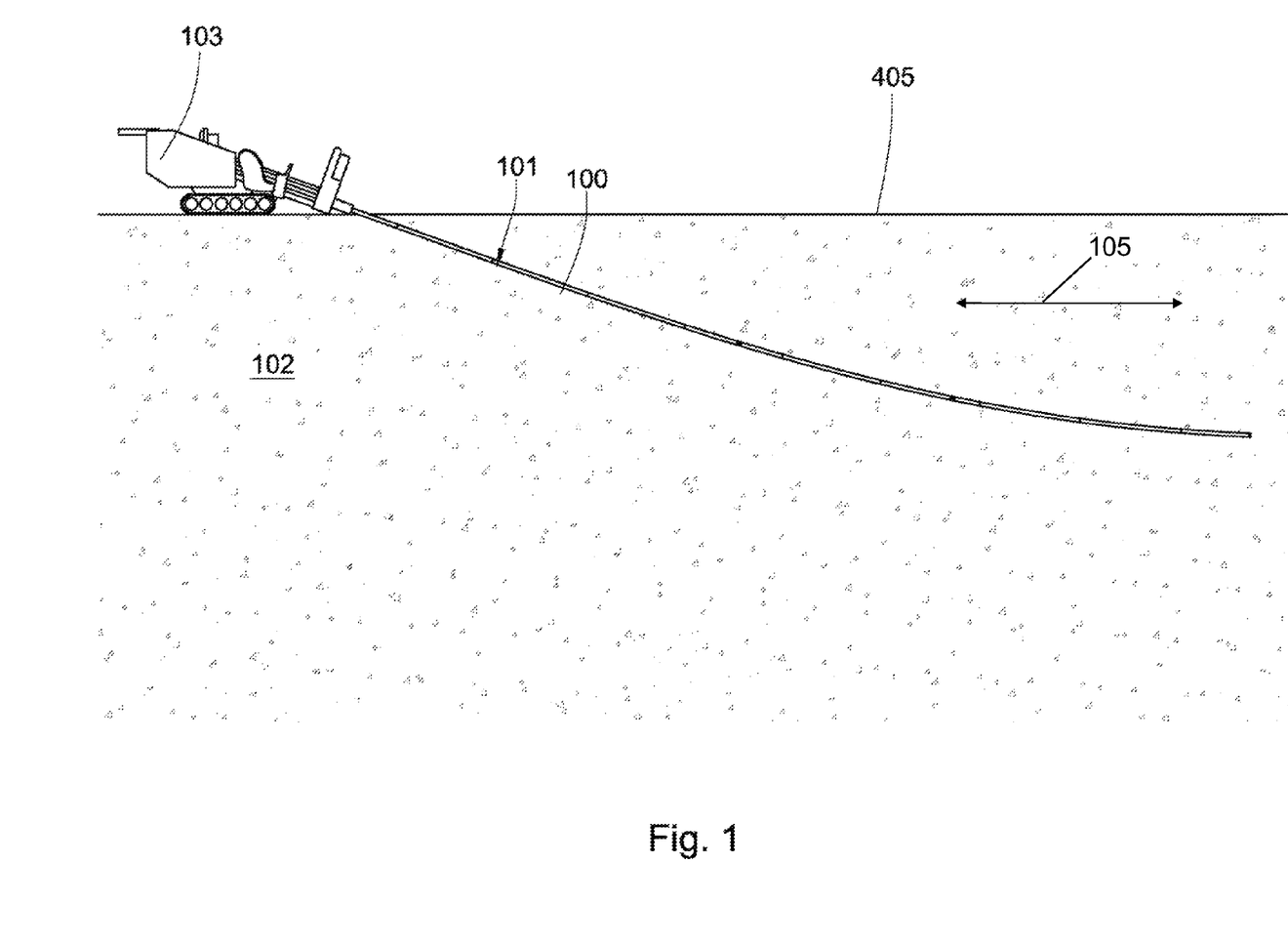
FIG. 1 is a cross-sectional diagram of an embodiment of a drill string in a horizontal drill well.

A tool string may be a drill string 100. The drill string 100 may drill a bore hole 101 in subterranean formation 102 in a horizontal direction 105 such as those used to install utility lines or for coal methane drilling. In other applications of the present invention, the tool string may be for use in deep oil and gas drilling, geothermal drilling, or various types of exploration. In the embodiment of FIG. 1, a rig 103 is placed at the ground or surface 405 and is angled such that the drill string 100 penetrates the ground or surface 405 at a non-perpendicular angle. As the drill string 100 advances, the bore hole 101 gradually becomes generally parallel to the ground or surface 405 and then eventually returns to the ground or surface 405 at a predetermined location. At the predetermined location, a back reamer may be attached to the drill string 100 and pulled back through the bore hole 101 in order to widen the hole for pipe and to insert other tools to be inserted. Cables such as fiber optic or metal cables may also be attached to the drill string 100 as it is pulled back through the bore hole 101.

To accomplish horizontal directional drilling, the drill string 100 may include a steering mechanism. The steering mechanism may allow the drill string 100 to change direction while drilling, which may allow the drill string 100 to avoid obstacles such as bodies of water or paved surfaces. Surface equipment, which may be part of the rig 103, may allow drill string operators to observe and manually control the direction of the bore hole 101.

Downhole tool string components may include drill pipes, jars, shock absorbers, mud hammers, air hammers, mud motors, turbines, reamers, under-reamers, fishing tools, steering elements, MWD tools, LWD tools, seismic sources, seismic receivers, pumps, perforators, packers, other tools with an explosive charge, mud-pulse sirens, or combinations thereof Downhole LWD tools may be located in a bottom hole assembly or along the length of the downhole tool string 100. The tools may be inductive resistivity tools, sensors, drill bits, motors, hammers, steering elements, links, jars, seismic sources, seismic receivers, and other tools that aid in the operations of the downhole tool string 100.

In order to provide power to downhole tools while drilling, the drill string 100 may include an electrical transmission system. An example of an electrical transmission system that may be compatible with the present invention is disclosed in U.S. patent application Ser. Nos. 11/428,445 which is now U.S. Pat. No. 7,488,194 that issued on Feb. 10, 2009; 11/559,461 which is now U.S. Pat. No. 7,527,105 that issued on May 5, 2009; 11/737,178 which is now U.S. Pat. No. 7,572,134 that issued on Oct. 11, 2009; and 11/693,909 to Hall et al., which is now U.S. Pat. No. 7,404,725 all of which are herein incorporated by reference. Also in some embodiments, the telemetry system disclosed in U.S. Pat. No. 6,670,880, which is also inhere incorporated by reference for all that it contains, may also be compatible with the present invention. Sensors may sense gamma rays, radioactive energy, resistivity, torque, pressure, temperature, or other drilling dynamics measurements or combinations thereof from the formation being drilled. Other sensors may be useful downhole such as, inclinometers, thermocouplers, accelerometers, and imaging devices. To transmit data in real-time from the tool string to surface equipment or data and/or power to downhole equipment swivel may be employed.

Figure 2:
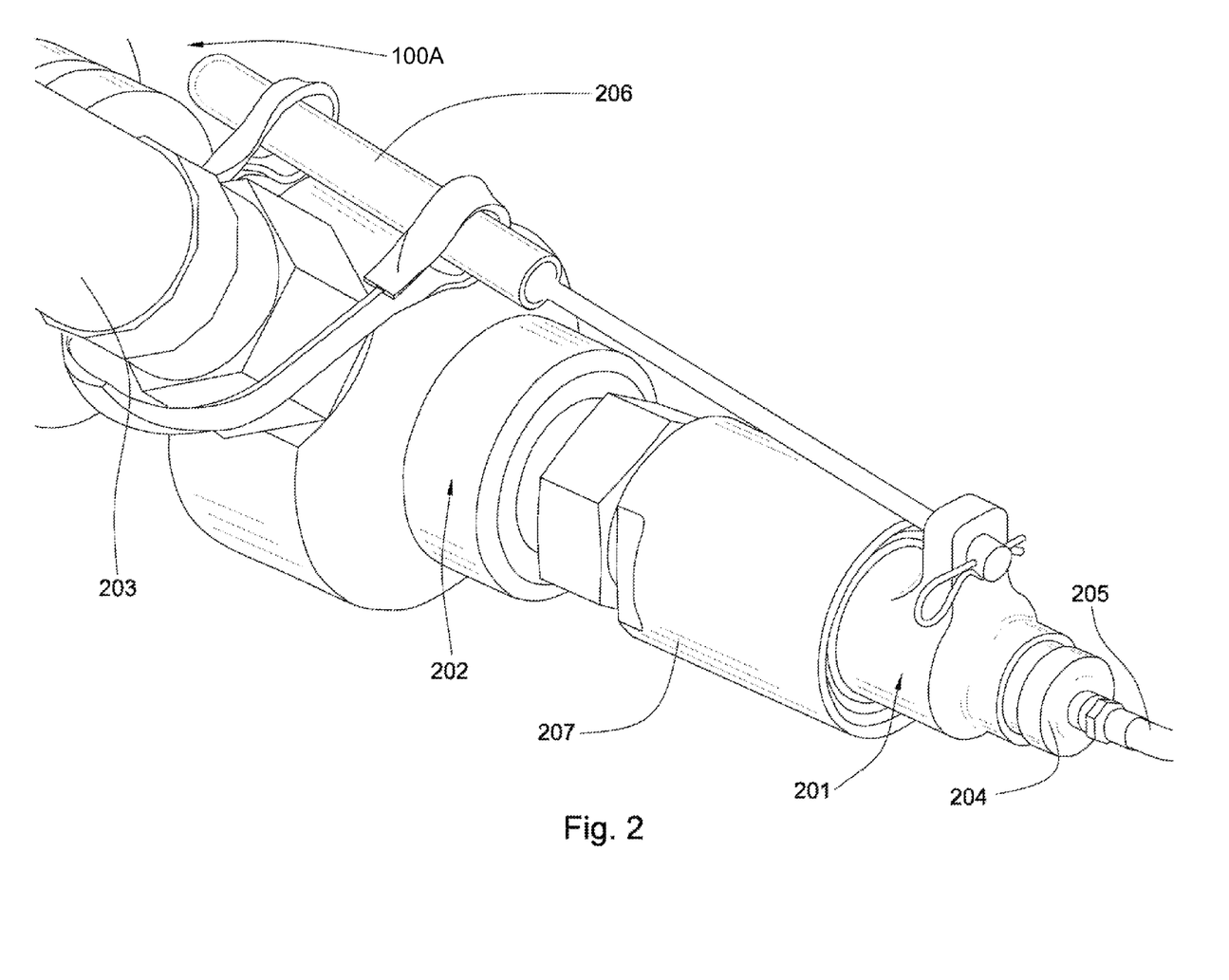
FIG. 2 is a perspective diagram of an embodiment of data swivel coupled to a tool string component.

Referring now to FIG. 2, a data swivel 201 may facilitate the transfer of data power and/or electricity between a rotating drill string 100A and the stationary rig 103 (FIG. 1) on the surface. In some embodiments the swivel 201 may be disposed downhole. The swivel 201 may be in electronic communication with a downhole telemetry system such as the systems discloses in U.S. Pat. Nos. 6,670,880 and 6,717,501 to Hall et al.

In FIG. 2, the data swivel 201 is electrically connected to the drill string 100A by a tool string component 202 via an NPT connector 207. In the present embodiment the tool string component 202 connects with the drill string 100 and with a drilling fluid supply pipe 203. The swivel 201 also includes a SubMiniature version A (SMA) connector 204 connected to a data cable 205, which may connect to an electrical device such as a computer, data processing unit, data storage unit, or combinations thereof. A rotary rod 206 may be attached to the swivel 201 and may assist in connecting the swivel 201 to the NPT connector 207. The tool string component 202 and the drill string 100A may be connected such that the drill string 100A may rotate while being rotatably connected to the component 202.

Figure 3:
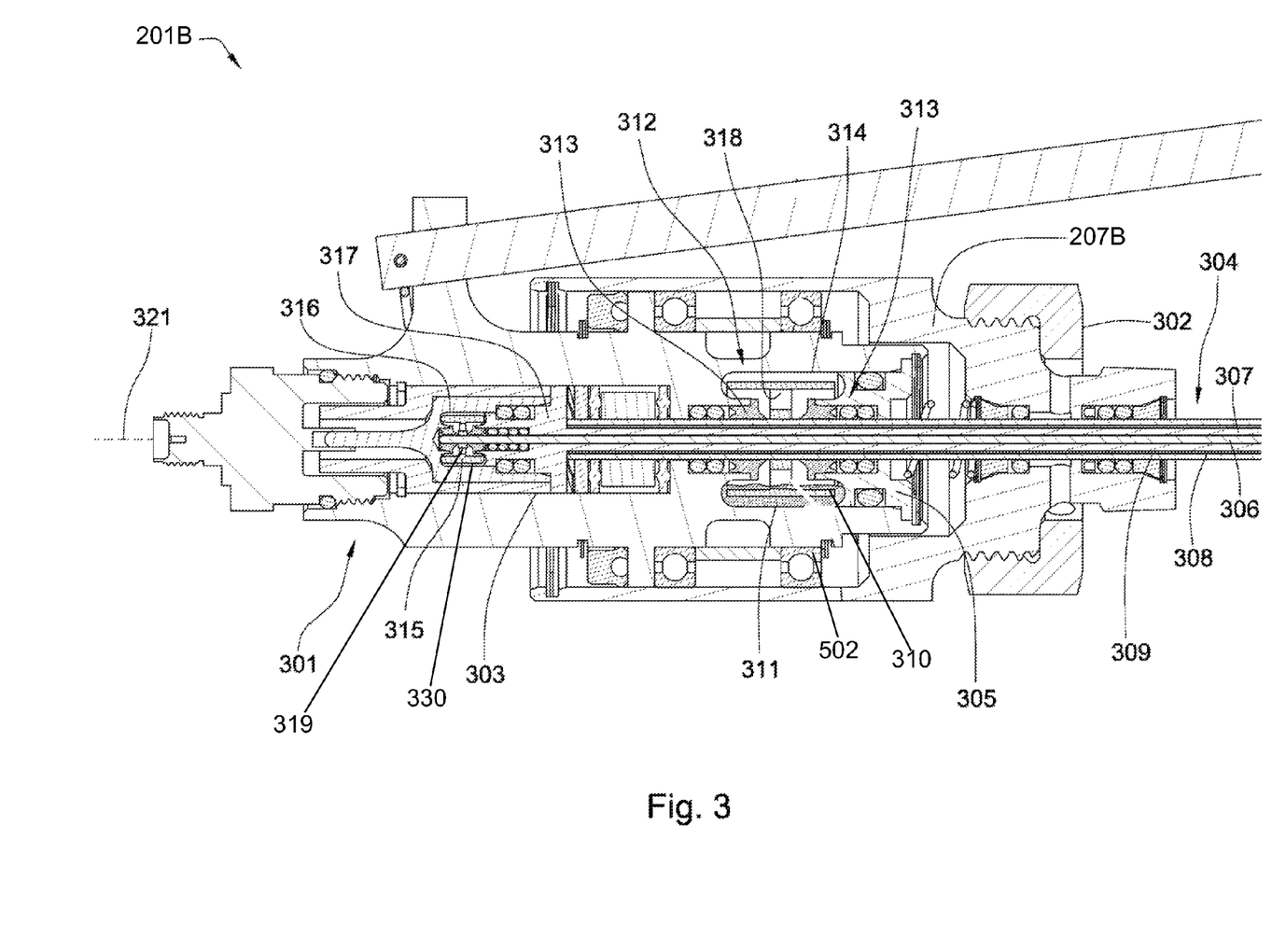
FIG. 3 is a cross-sectional diagram of an embodiment of a data.

FIG. 3 discloses a cross-sectional diagram of a data swivel 201B in accordance with the present invention. Data swivel 201B includes a body 301 that is adapted for threaded connection with tool string component 202 (FIG. 2) via an NPT connector 207B and a swivel nut 302. The body 301 comprises a central bore 303 in which an electrically conductive medium 304 is rotationally supported. The electrically conductive medium 304 is adapted to rotate with respect to an electrically conductive receiver 305 that is fixed to and disposed within the body 301. In the current embodiment, the electrically conductive medium 304 is a coaxial cable, but the electrically conductive medium 304 may be a coaxial cable, a pair of twisted wires, a biaxial cable, a triaxial cable, insulated copper wires, or combinations thereof. The electrically conductive medium 304 in the present embodiment has an electrically conductive core 306 that is surrounded by a dielectric material 307. The dielectric material 307 may be selected from the group consisting of alumina, ferrite, polycrystalline diamond, carbon, polymers, plastics, rubber, latex, and/or oxides of Mg, Al, Si, Yb, Ca, Be, Sr, Ns, Sm, Er, Eu, Sc, La, Gd, Dy, Tm, and combinations thereof.

The dielectric material 307 may be surrounded by a shield 308 and by a stainless steel conduit 309. The shield 308 and conduit 309 may help to form electrical connections between adjacent components at downhole junctions of the components. The shield 308 and conduit 309 may also protect the electrical signal as it passes from one component to another. This may provide the advantage of keeping the power and/or data signals undistorted Mile they are traveling from component to component. In some embodiments of the invention electrical power may be transferred downhole via the core 306 and data may be transferred back uphole via the conduit 309 or shield 308. Alternatively, power may be transferred downhole via one electrically conductive medium like electrically conductive medium 304 and data may return uphole via a separate electrically conductive medium like electrically conductive medium 304.

An electrically conductive hollow cylinder 310 is rotationally fixed to the conduit 309 by an electrically conductive arm 318. The electrically conductive arm 318 with the hollow cylinder 310 extends from the electrically conductive medium 304 into an electrically conductive fluid 311 disposed within a reservoir 312. In the present embodiment, the reservoir 312 is disposed circumferentially around a portion of the electrically conductive medium 304. Whenever the electrically conductive arm 318 is at least partially disposed within the electrically conductive fluid 311, the electrically conductive medium 304 and the electrically conductive receiver 305 may be in electrical communication. The reservoir 312 is partially filled by the electrically conductive fluid 311.

In some embodiments, the reservoir 312 has a total volume; and the total volume of the reservoir 312 may be less than 50% filled by the electrically conductive fluid 311. In some embodiments a non-conductive pressurized lubricant may fill some or all of the reservoir's volume that is not filled by the electrically conductive fluid 311.

A plurality of rotary seals 313 are disposed between the reservoir 312 and the electrically conductive medium 304. The rotary seals 313 are designed to prevent the electrically conductive fluid 311 from going between the reservoir 312 and the electrically conductive medium 304. The rigid shape of the reservoir 312 is adapted to prevent the electrically conductive fluid 311 from accumulating around the rotary seals 313.

The swivel 201B may have a plurality of reservoirs like reservoir 312 or a plurality of electrically conductive arms like electrically conductive arms 318. In FIG. 3, the swivel 201B has two reservoirs 312 and 316 shown disposed within the body 301. Separate electrically conductive arms 318 and 319 are disposed within each reservoir 312 and 316, respectively. Each electrically conductive arm 318 and 319 is attached to the same electrically conductive medium 304. In some embodiments of the invention, each electrically conductive arm 318 and 319 may be attached to separate electrically conductive cylinders 310 and 315 which extend in part into electrically conductive fluid 311 in reservoir 312 and electrically conductive fluid 330 in reservoir 316 from the electrically conductive medium 304.

In some embodiments, first electrically conductive arm 319 electrically connects to the electrically conductive cylinder 315 via the fluid 311B to the reservoir 316 to place an electrically conductive receiver 317 into electrical communication directly with the core 306 of the electrically conductive medium. The other electrically conductive arm 318 is connected to the electrically conductive cylinder 310 and position to contact the electrically conductive fluid 311 in the other reservoir 312 to place the electrically conductive receiver 305 into electrical communication with the conduit 309. This may allow for power to be sent down the core 306 and return via the conduit 309 or vice versa. The electrically conductive fluids 311 and 330 may be mercury, indium, an aqueous solution, liquid metal, gallium, eutectic mixtures, mixtures thereof, compositions thereof, or a combination thereof.

Figure 4:
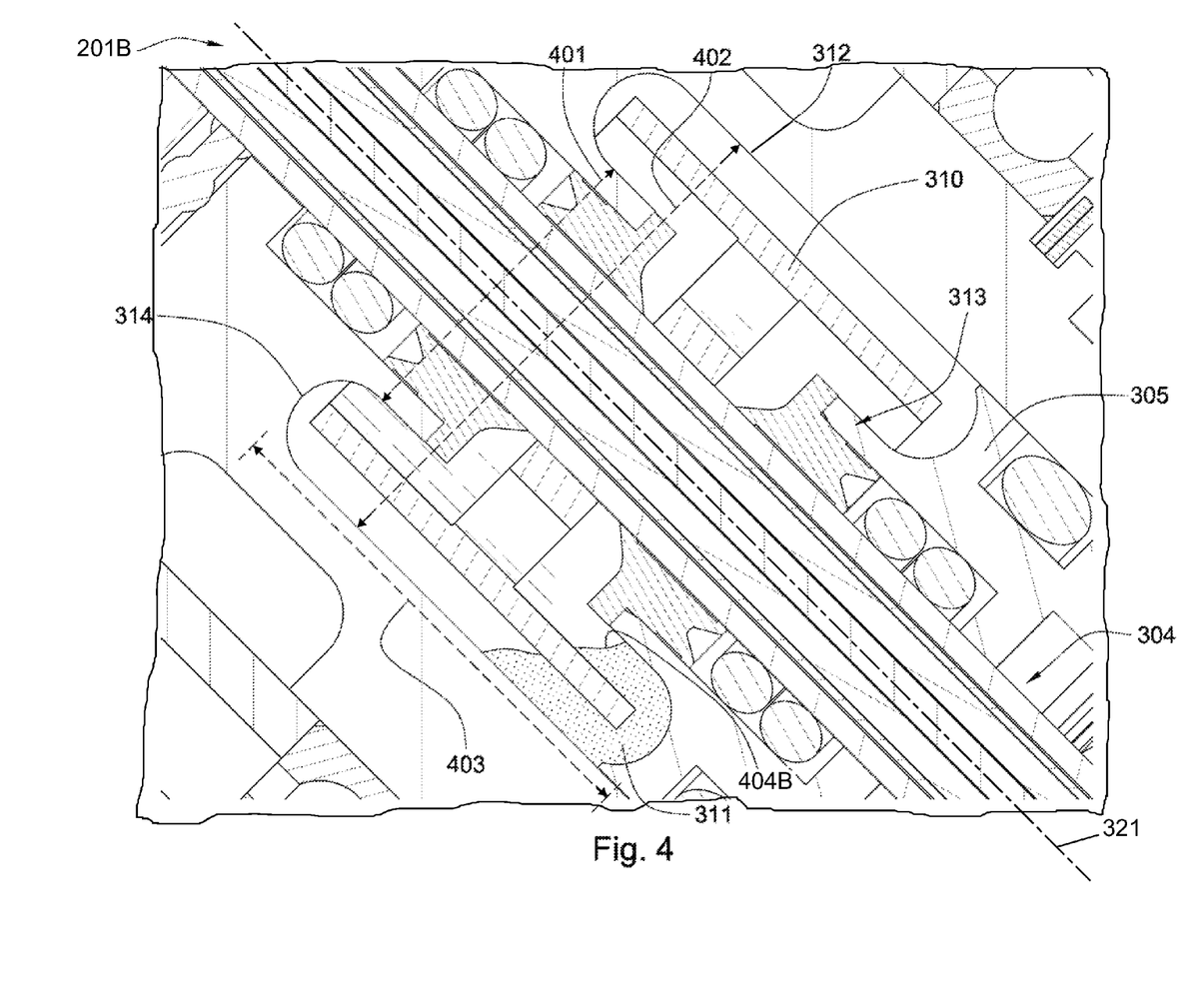
FIG. 4 is a cross-sectional diagram of an embodiment of a data swivel rotated 45 degrees from the embodiment disclosed in FIG. 3.
Figure 5:
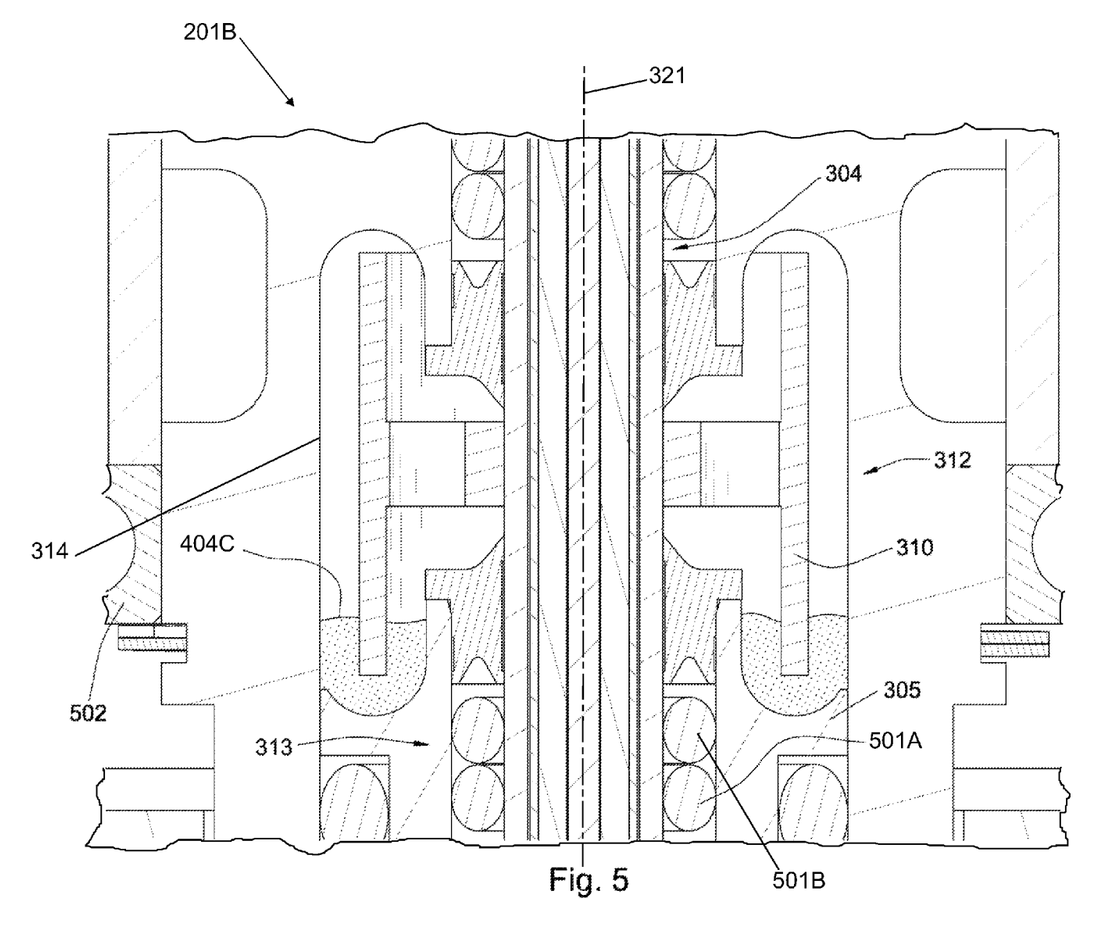
FIG. 5 is a cross-sectional diagram of an embodiment of a data swivel that is orthogonal to the embodiment disclosed in FIG. 3.

Referring now to FIGS. 3-5, as the swivel 201B is rotated the electrically conductive fluid 311, which is retained within the reservoir 312 between the electrically conductive receiver 305 and the electrically conductive arm 310. The electrically conductive fluid 311 is also kept away from contact with the rotary seals 313. This is accomplished by the rigidity and the shape 314 of the reservoir 312. In the present embodiment, the reservoir 312 is generally cylindrical and is coaxial with the body 301. Both the reservoir 312 and the body 301 share a common central axis 321. The reservoir 312 is a cylinder 314 that has inner diameters 401 and outer diameter 402. The electrically conductive fluid 311 may flow along a length 403 of the reservoir 312 between the inner and outer diameters 401, 402.

In FIG. 4 the swivel 201B is rotated 45 degrees from the position of the swivel 201B seen enlarged in FIG. 3. In FIG. 3, the central axis 321 of the reservoir 312 and the central axis of the electrically conductive medium 304 are the same. The upper surface 404B of the fluid 311 are generally parallel to the ground 405 (see FIG. 1). In FIG. 4, the upper surface 404B is parallel to the ground 405, but the axis 321 is not parallel with the ground 405. The fluid 311 is retained within the reservoir 312 between the electrically conductive receiver 305 and the electrically conductive arm 310. The electrically conductive fluid 311 is retained spaced away from the seals 313 both when the central axis 321 of the reservoir 312 is parallel with the ground 405 and when it is not parallel. Pooling contact of electrically conductive fluids with the seals 313 may lead to some electrically conductive fluid 5 escape from the swivel 201 or faster degradation of the seals 313.

In FIG. 5, the swivel 201B is rotated 90 degrees from the position of the swivel 201B in FIG. 3. The upper surface 404C of the electrically conductive fluid 311 is still parallel to the ground 405, but the central axis 321 of the reservoir 312 is now perpendicular to the ground 405. The fluid 311 is still retained within the reservoir 312 between the electrically conductive receiver 305 and the electrically conductive arm 310 and away from the seals 313.

Also as seen in FIG. 5, the rotary seals 313 may be O-rings 501A and 501B. O-rings 501A and 501B may help to hold the seals 313 in place during rotation of the electrically conductive medium 304 within the swivel 201B. In some embodiments, at least one rotary seal 313 may comprise at least one O-ring, gasket, adhesive, washer, fastener, or combinations thereof. Springs or bearings 502 may be disposed within the body 301. Bearings 502 may assist with the connection of the body 301 with the NPT connector 207 (FIG. 2). Springs may include wave springs, Belleville springs, coiled springs or combinations thereof.

Figure 6:
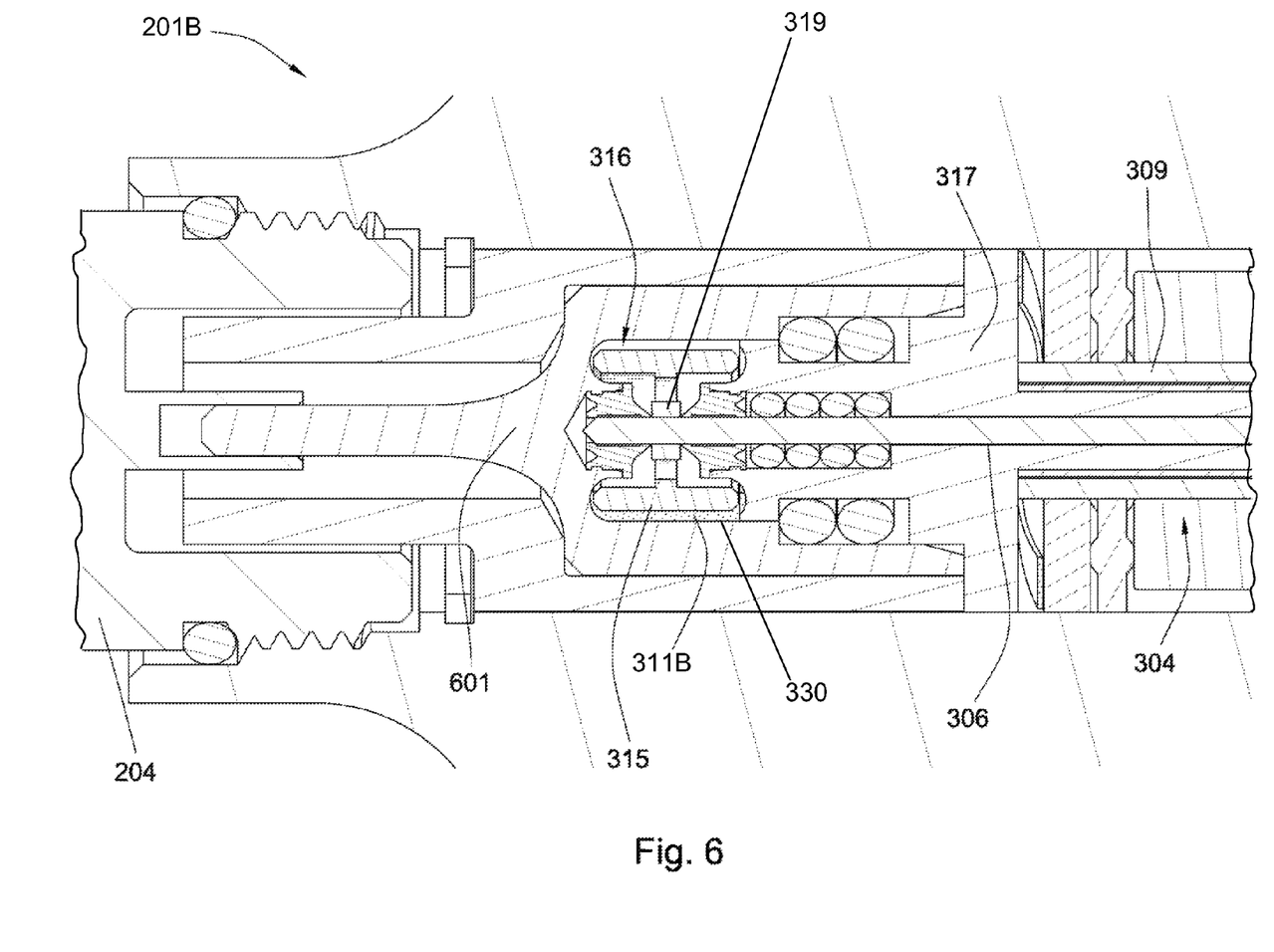
FIG. 6 is a cross-sectional diagram of another embodiment of a data swivel.

Referring now to FIG. 6, a partial cross-sectional diagram of swivel 201B shows electrically conductive arm 319 connected to electrically conductive structure 315 that is positioned in the reservoir 316. The electrically conductive receiver 317 is in electrical communication with the core 306 via the electrically conductive fluid 311B and the electrically conductive structure 315 and the electrically conductive arm 319. The electrically conductive medium 304 is connected to surface equipment (not shown) by a conductor body 601 which contacts the SMA connector 204. In some embodiments, the electrically conductive receiver 317 may receive a first signal carried up the electrically conductive medium 304, and the receiver 305 may receive a second signal carried up the same electrically conductive medium 304. In such embodiments, one signal may be carried through the core 306 and the other signal may be carried through the conduit 309.

Figures 7, 8:
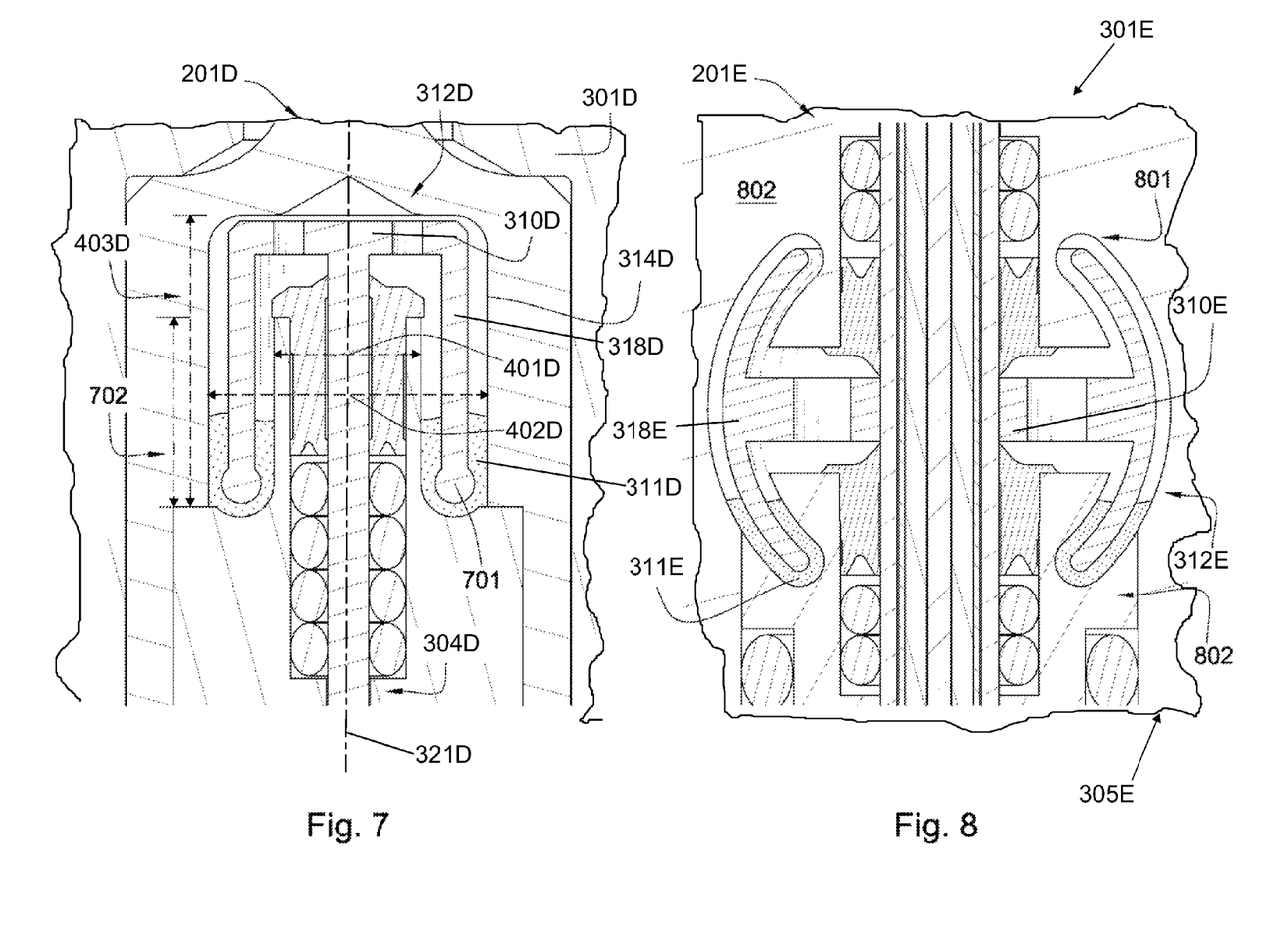
FIG. 7 is a cross-sectional diagram of another embodiment of a data swivel.
FIG. 8 is a cross-sectional diagram of another embodiment of a data swivel.

FIGS. 7-8 disclose alternative shapes 314 for reservoirs 312D and 312E for use in swivels 201D and 201E. The reservoir 312D in FIG. 7 is generally cylindrical that is coaxial with the body 301. The reservoir 312 has an outer diameter 402D along its entire length 403D; but it only has an inner diameter 401D along a distal portion 702 of length 403D. The electrically conductive structure 318D is connected to electrically conductive 310D, which extends radially outward from the electrically conductive medium 304D. The electrically conductive structure 318D has a central axis 321D that is roughly parallel with and is here shown to be the same as the central axis 321D of the electrically conductive medium 304. FIG. 7 also shows an end 701 of the electrically conductive structure 318 to have a generally circular cross-section radially.

In FIG. 8, the swivel 201E has a reservoir 312E which is shown having a generally curved or barrel shape. The reservoir 312E is closed on opposite ends 801 and 802. The electrically conductive structure 318E extends from electrically conductive 310E and is similarly is generally curved or barrel shaped. The curved shape may increase the amount of contact surface area between the electrically conductive structure 318E and the fluid 311E regardless of the orientation of the swivel 201E. A portion 802 of the body 301 may be electrically conductive material. This portion 802 may be part of the receiver 305E.

Figure 9:
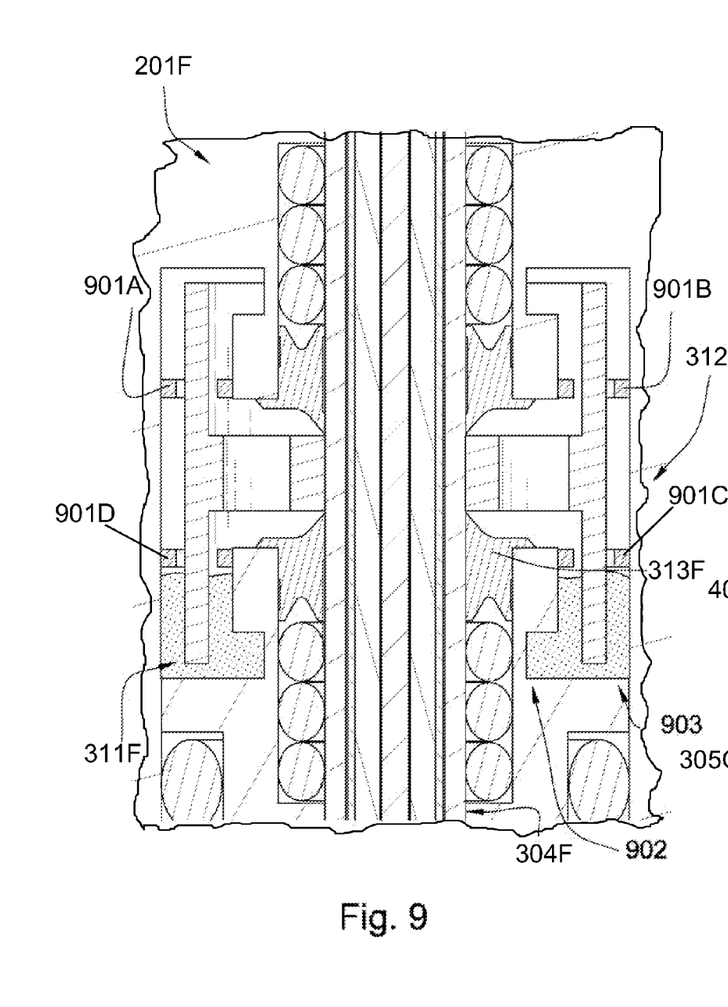
FIG. 9 is a cross-sectional diagram of another embodiment of a data swivel.

FIG. 9 shows a portion of a swivel 201F having a reservoir 312F and flow restrictors 901A-F proximate the rotary seal 313F. The reservoir 312F also has a reservoir branch 902 that extends from the main volume 903 of the reservoir 312F towards the electrically conductive medium 304. Electrically conductive fluid 311F may be restricted from greater contact with the rotary seals 313 by pooling the electrically conductive fluid 311F in the branch 902 and by placing the flow restrictors 901A-F proximate the seals 313.

Figure 10:
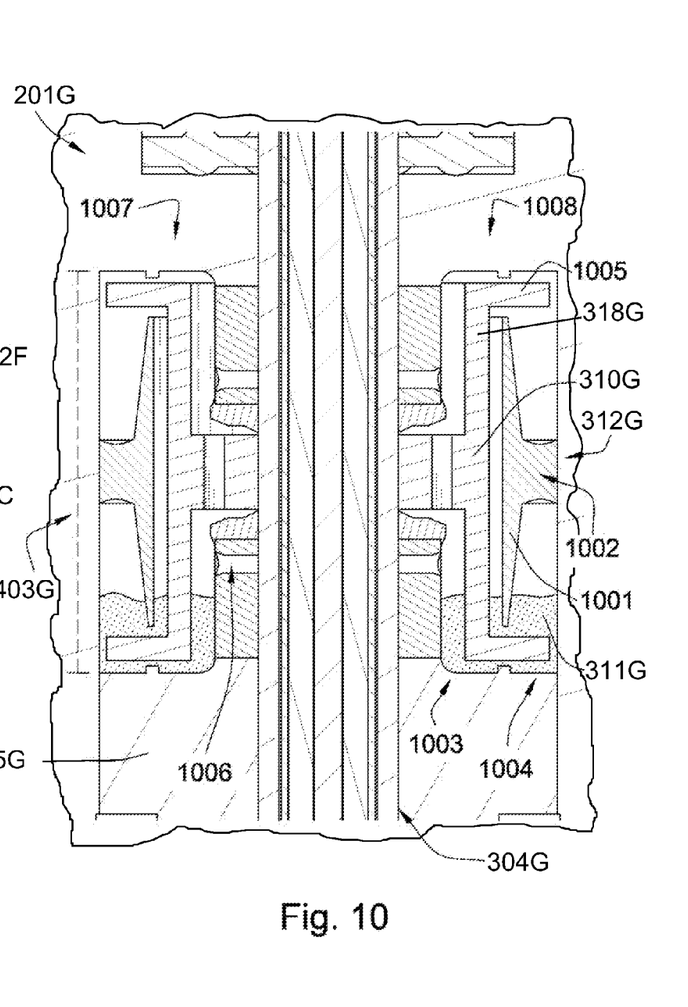
FIG. 10 is a cross-sectional diagram of another embodiment of a data swivel.

Referring now to FIG. 10, the swivel 201G has a reservoir 312 with an internal separator wall 20 1001. The internal separator wall 1001 may be attached to the reservoir 312G at a center point 1002 and taper outward to extend along most of the length 403G of the reservoir 312G. A portion of the electrically conductive fluid 311G is disposed on an inner side 1003 of the wall 1001 and a portion of the fluid 311G is disposed on an outer side 1004 of the wall 1001. When the swivel 201G is rotated, the fluid 311G on the outer side may be retained from contact with the rotary seals 313 (FIG. 3) by the wall 1001. The electrically conductive arm 310 supports the electrically conductive structure 318G which is a hollow cylinder. A radial extension 1005 of the electrically conductive structure 318G may increase contact surface area between the electrically conductive structure 318G and the fluid 311G. The extension 1005 may also ensure electrical communication of the electrically conductive receiver 305G and the electrically conductive medium 304G when the swivel 201G is orthogonal to the diagram disclosed in FIG. 10. One or more channels 1006 may extend from a first end 1007 of the reservoir 312G to a second end 1008 of the reservoir 312G. This may direct fluid 311G away from the rotary seals like rotary seals 313 (FIG. 3) and discourage overflow of the fluid 311G onto the seals.

In some embodiments of the invention a channel 1006 may extend from a first reservoir 316 to a second reservoir 319.

Whereas the present invention has been described in particular relation to the drawings attached hereto, it should be understood that other and further modifications apart from those shown or suggested herein, may be made within the scope and spirit of the present invention.

What is claimed is:

1. A swivel for use with a rotating tool string, said swivel comprising:
    a body adapted for threaded connection in said rotating tool string, said body having a central bore configured to receive an electrically conductive medium therein;
    an electrically conductive receiver fixed to and disposed within said body;
    a reservoir formed in said body in electrical contact with said electrically conductive receiver;
    an electrically conductive fluid positioned in said reservoir in electrical contact with said electrically conductive receiver;
    an electrically conductive arm that is fixed to the electrically conductive medium and sized to extend into said electrically conductive fluid;
    an electrically conductive structure attached to said electrically conductive arm to extend in part into said electrically conductive fluid in said reservoir, said electrically conductive structure being cylindrical and extending transverse to said arm;
    a rotary seal positioned about said electrically conductive medium to inhibit leakage of said electrically conductive fluid from said reservoir.

2. The swivel of claim 1, wherein said electrically conductive medium has a circumference and wherein said reservoir is disposed outwardly from said circumference of said electrically conductive medium.

3. The swivel of claim 1, further including a second reservoir formed in said body, and wherein said electrically conductive medium extends to said second reservoir, wherein said electrically conducive medium includes a first conductor electrically insulated from a second conductor, wherein said electrically conductive arm is in electrical contact with said first conductor, and further including a second electrically conductive receiver in electrical contact with said second reservoir and a second electrically conductive fluid positioned in said second reservoir in electrical contact with said reservoir and said electrically conductive receiver, and further including a second electrically conductive arm fixed to said second conductor and configured to extend outwardly there from for contact with said electrically conductive fluid.

4. The swivel of claim 1, wherein said electrically conductive receiver is in electrical communication with an electrical device.

5. The swivel of claim 1, wherein the electrically conductive medium has an axis, and wherein said electrically conductive structure has an axis that is coaxial with the axis of said electrically conductive medium.

6. The swivel of claim 5, wherein said electrically conductive structure is a hollow cylinder.

7. The swivel of claim 5, wherein the electrically conductive structure is barrel shaped and hollow.

8. The swivel of claim 5, wherein said reservoir is toroidal in shape having an inner surface and an outer surface spaced away from said inner surface to define a volume therebetween.

9. The swivel of claim 1, wherein the electrically conductive fluid is one of mercury, indium, liquid metal, gallium and eutectic mixtures.

10. The swivel of claim 1, wherein the electrically conductive medium is one of a coaxial cable, a pair of twisted wires, a biaxial cable, a triaxial cable and insulated copper wires.

11. The swivel of claim 1, wherein the electrically conductive medium has an electrically conductive core surrounded by a dielectric material.

12. The swivel of claim 1, wherein the one rotary seal is one of an O-ring or gasket.

13. The swivel of claim 1, wherein the receiver is an electrically conductive portion of the body.

14. The swivel of claim 1, wherein said reservoir has a volume and wherein less than 50% of said volume is filled with the electrically conductive fluid.

15. The swivel of claim 14, wherein said reservoir has a central axis and is shaped to retain the electrically conductive fluid within the reservoir between the electrically conductive receiver and the electrically conductive arm and away from the at least one rotary seal.

16. The swivel of claim 14, wherein said reservoir contains said electrically conductive fluid and a non electrically conductive fluid.

17. The swivel of claim 16, wherein the volume of said electrically conductive fluid and the volume of said non electrically conductive fluid together substantially fill said reservoir.

18. The swivel of claim 1, wherein the reservoir includes an internal separator wall.

19. The swivel of claim 1, wherein the reservoir includes a flow restrictor proximate the rotary seal.

20. The swivel of claim 1, wherein the swivel is in electronic communication with a downhole telemetry system.

* * * * *